United States Patent [19]
Graeff

[11] Patent Number: 5,566,468
[45] Date of Patent: Oct. 22, 1996

[54] PROCESS AND APPARATUS FOR REGENERATING A MOIST ADSORPTION MEDIUM

[75] Inventor: Roderich W. Graeff, Darmstadt, Germany

[73] Assignee: SOMOS GmbH, Weiterstadt, Germany

[21] Appl. No.: 247,545

[22] Filed: May 23, 1994

[30] Foreign Application Priority Data

May 28, 1993 [DE] Germany .................... 43 17 768.9

[51] Int. Cl.[6] ........................... F26B 21/06
[52] U.S. Cl. ............................. 34/80; 34/473
[58] Field of Search .................. 34/80, 376, 378, 34/416–428, 472, 473; 62/480; 55/267, 217

[56] References Cited

U.S. PATENT DOCUMENTS

| | | | |
|---|---|---|---|
| 4,030,896 | 6/1977 | Wimber et al. | 55/33 |
| 4,391,616 | 7/1983 | Inamura | 55/35 |
| 4,413,426 | 11/1983 | Gräff | 34/27 |
| 4,434,034 | 2/1984 | Padilla | 202/153 |
| 4,698,073 | 10/1987 | Rohde et al. | 55/33 |
| 4,793,143 | 12/1988 | Rhodes | 62/93 |
| 4,858,335 | 8/1989 | Roth | 34/80 X |
| 4,870,760 | 10/1989 | Graeff | 34/32 |
| 5,172,489 | 12/1992 | Moller | 34/80 X |

FOREIGN PATENT DOCUMENTS

| | | |
|---|---|---|
| 162537 | 11/1985 | European Pat. Off. . |
| 2307567 | 11/1976 | France . |
| 2751284 | 5/1979 | Germany ................ 34/80 |
| 3412173 | 10/1985 | Germany . |
| 3625013 | 1/1988 | Germany . |
| 58-170518 | 10/1983 | Japan . |
| WO80/01315 | 6/1980 | WIPO . |

OTHER PUBLICATIONS

Owerfeldt et al., *Plastverarbeiter* (plastic processor), vol. 38, No. 8, pp. 60–62 (1987).

Owerfeldt et al., *Kunststoffe* (plastics), vol. 78, No. 4, pp. 318–322 (1988).

*Primary Examiner*—William Doerrler
*Attorney, Agent, or Firm*—Evenson, McKeown, Edwards & Lenahan, P.L.L.C.

[57] ABSTRACT

A process and an apparatus for processing an adsorption medium which, by means of a hot gas, is freed of an agent, particularly moisture, adsorbed in the adsorption medium and is then cooled by a stream of gas or air. In order to avoid undesired heating of the exiting gas stream and/or of the drying air, a stream of cooling gas emerging from the hot adsorption medium is conducted through a heat accumulator for receiving the heat from the hot adsorption medium and then is recirculated through the adsorption medium.

27 Claims, 4 Drawing Sheets

PROCESS AND APPARATUS FOR REGENERATING A MOIST ADSORPTION MEDIUM

BACKGROUND OF THE INVENTION

This invention relates to a process for processing an adsorption medium which, by means of hot gas, is freed of an agent, particularly moisture, adsorbed therein, and is then cooled by means of a stream of gas. The invention further relates to an apparatus for carrying out the process of the invention.

A moisture-laden gas stream is formed, for example, as the exit gas from a hopper in which plastic granules are dried by a stream of drying air. In such a case, for example, as described in Graeff, U.S. Pat. No. 4,870,760, the exit gas is conducted through one or more drying vessels filled with an adsorption medium, whereby the adsorption medium extracts the moisture from the gas so that the resulting dry gas can be used again as a drying gas for drying plastic granules.

When the adsorption medium in a drying vessel is saturated with moisture, the drying vessel is transferred to a regeneration phase in which heated outside air is conducted through the adsorption medium and thereby takes up and carries away the moisture which was adsorbed therein. At approximately 250° C., the temperature of the hot air used for regenerating the adsorption agent is significantly higher than the temperature of the exit air to be dried, which is normally 60° C.

When a drying vessel, after it has been regenerated, is used again to adsorb moisture from the exit gas, it initially fails to dry the exit gas because the temperature of the adsorption medium is too high. In addition, the exit gas which flows through the hot adsorption agent is heated to a temperature which is above the temperature desired for the drying air.

Measures have therefore been suggested to cool the adsorption medium, which is still very hot at the end of a regeneration phase, and to delay making the absorption medium available for adsorbing moisture from the exit air until after the absorption medium has been cooled. Published European Patent Application No. EP 162,537 discloses two drying vessels connected in parallel, one of which is in the regeneration phase when the other is in the adsorption phase. In order to cool the hot adsorption medium, a partial stream of the exit gas is directed through the hot adsorption medium at the end of the regeneration phase and is then admixed with the drying gas exiting from the other drying vessel. This has the disadvantage that the partial flow of the exit gas which is used for cooling the adsorption medium is not dried, and consequently the moisture content of the drying air is adversely affected. In addition, the drying air is heated considerably by the partial stream of exit gas used to cool the adsorption medium, and this heating of the drying air is undesirable in many applications.

Roth, Published German Patent Application No. DE 3,412,173, discloses using a partial stream of drying air for cooling the hot adsorption medium and then after the partial stream has passed through the hot adsorption medium, returning the partial stream to the stream of supplied exit air. This arrangement has the disadvantages that, during the cooling phase, only a smaller amount of drying air is available to the drying stage, and that the temperature of the exit gas to be processed is increased to a value which reduces the efficiency of the adsorption.

Despite the efforts of the prior art, there remains a need for a better method and apparatus for regenerating a moist adsorption agent.

SUMMARY OF THE INVENTION

It is therefore the object of the invention to provide an improved method and apparatus for regenerating a moist adsorption medium.

Another object of the invention is to provide a method and apparatus which avoids excessive heating of the exit gas or the drying air.

A further object of the invention is to provide a method and apparatus which effectively cools a regenerated adsorption medium.

These and other objects of the invention are achieved by providing a process for regenerating an adsorption medium which is freed of an agent adsorbed therein by treatment with a hot gas and thereafter cooled by a stream of cooling gas, wherein a warmed stream of cooling gas emerging from the hot adsorption medium is conducted through a heat accumulator for taking up heat from the hot adsorption medium and then recirculated through the adsorption medium.

In accordance with a further aspect of the invention, the objects are achieved by providing an apparatus for regenerating an adsorption medium in which the adsorption medium is freed of an adsorbed substance by treatment with a hot treatment gas, the apparatus comprising at least one dryer vessel containing a charge of an adsorption medium for the substance, a supply line for a gas containing the substance, a connecting line leading from the supply line to the at least one vessel, an outlet line for exhausting gas from the at least one vessel, a regeneration line communicating between the connecting line and the outlet line, a heater associated with the at least one vessel for heating a gas flowing therethrough, a heat accumulator associated with the regeneration line for absorbing heat from a hotter gas or releasing heat to a cooler gas traversing the regeneration line, valve means for selectively switching gas flow in the apparatus between a drying circuit comprising the supply line, the connecting line, the at least one vessel containing the charge of adsorption medium, and the outlet line, and a regenerating circuit comprising the regeneration line, the heat accumulator, the heater, the at least one vessel containing the charge of adsorption medium, and the connecting line, and fan means operable to convey gas through the drying circuit or through the regenerating circuit.

In accordance with the invention, a stream of cooling gas emerging from the hot adsorption medium is conducted through a heat accumulator for absorbing the heat from the hot adsorption medium, and after passing through the heat accumulator, the stream of cooling gas is recycled through the hot adsorption medium. As a result, the hot adsorption medium cannot have any influence on the drying operation and/or the drying air. In addition, the heat contained in the hot adsorption medium is not lost. Instead, during the adsorption phase following the regeneration, this heat may be extracted from the heat accumulator for other uses. This significantly improves the energy balance of the processing of the outgoing gas. The heat accumulator is virtually maintenance free and is therefore a very low-cost accessory for the dryer.

In an advantageous further embodiment of the invention, the heat contained in the heat accumulator is used at the beginning of the subsequent regeneration step to heat the gas used for the regeneration, whereby heating energy is saved.

In order to avoid a decrease in the flow of drying air during the regeneration, it is preferred to use outside air for regenerating the adsorption medium.

If, in accordance with a preferred embodiment of the invention, the gas stream which emerges from the hot adsorption medium is repeatedly recirculated through the heat accumulator and the adsorption medium until the adsorption medium is sufficiently cooled, then there is no possibility that the gas stream used to cool the adsorption medium will deposit moisture back into the adsorption medium, which would occur if fresh outside air were used to cool the adsorption medium.

If in accordance with a further preferred embodiment of the invention, a material, such as metal, which has a high specific heat and/or high thermal conductivity, is used as the storage medium, then the space requirement for the heat accumulator will be reduced. The use of glass or rocks as a storage medium facilitates easy replacement of the storage medium if the medium becomes contaminated by deposition of foreign matter carried along with the gas. Furthermore, for this purpose it is also recommended to improve the heat transfer between the hot dry gas and the storage material by appropriately shaping the storage material and/or increasing the flow rate of the gas through the heat accumulator. The use of spherical storage materials made of iron or glass or small rocks which have an average diameter of approximately 2 to 10 mm has proved particularly suitable.

The amount of the storage medium should preferably be selected such that the product of the weight of the storage material and its specific heat is approximately equal to or greater than the product of the weight of the adsorption medium to be cooled and its specific heat.

In order to carry out the process, an apparatus may be used having a drying air dryer which comprises at least one drying vessel filled with an adsorption medium, a fan connected in series with the drying vessel, a regeneration line with a heating device connected through controllable valves to an outlet line for the drying gas, and an exit gas supply line for the drying air dryer. This apparatus is further characterized by the fact that the regeneration line is provided with a heat accumulator for receiving the heat from the hot adsorption medium which is connected through another controllable valve with the outgoing gas feed line.

In a preferred embodiment of the apparatus of the invention, the heat accumulator contains a heat storage medium which comprises a material having a high specific heat, such as glass, metal or rocks. The storage material is preferably spherical, and the balls of storage material advantageously have diameters of about 2 to about 10 mm.

BRIEF DESCRIPTION OF THE DRAWINGS

The invention will be described in further detail hereinafter with reference to preferred embodiments illustrated in the accompanying drawings in which.

DETAILED DESCRIPTION OF PREFERRED EMBODIMENTS

Figure 1:
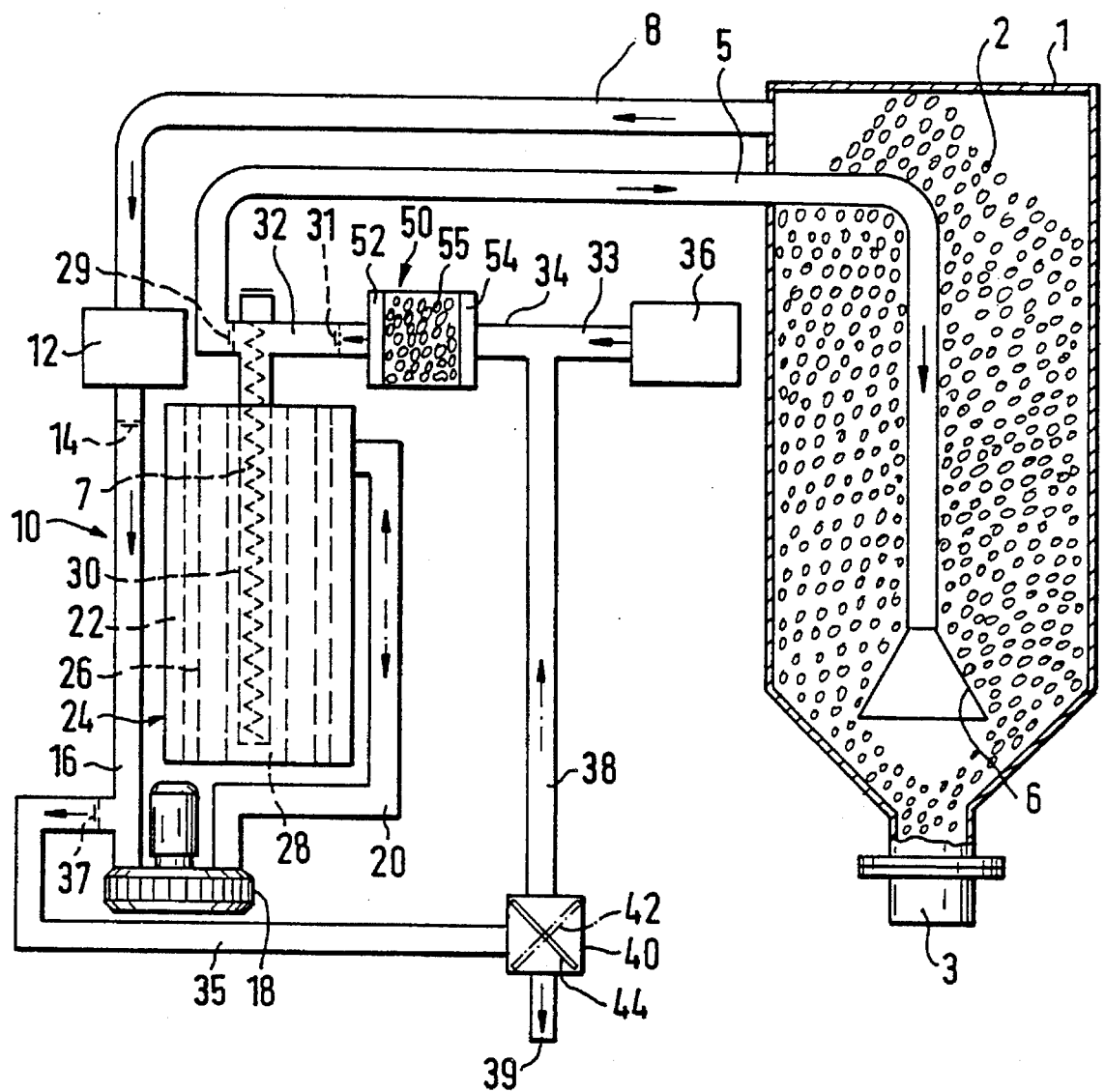
FIG. 1 is a view of an apparatus equipped with the features of the invention comprising a drying vessel for drying a moist exit gas from a plastic pellet drying hopper.

A charge of plastic granules 2 is introduced, continuously or intermittently, through an upper feed opening (not shown) into a drying hopper 1, where the granules are dried. After drying, the granules are discharged from the drying hopper through a lower discharge opening 3 and are supplied, for example, to an apparatus for manufacturing plastic articles (not shown). In order to dry the charge 2, a drying-air supply line 5 extends into the drying hopper 5 and ends in a distributor 6 adjacent the discharge opening 3 of the hopper. Drying air, which has been heated to a required temperature of 80° C. or more, is introduced through line 5 into the drying hopper 1 and flows upwardly through the charge 2 in the hopper and exits the hopper through an exit air line 8 emanating from the lid of the drying hopper 1.

The moisture-laden air exiting from drying hopper 1 is conducted by the exit air line 8 to a drying air dryer, designated generally by reference numeral 10, in which the entrained moisture is extracted from the exit air. In the drying-air drier 10, the exit air from line 8 passes through a first solid filter 12 and a flap valve 14 to the intake line 16 of a fan 18 whose pressure line 20 leads to an outer annular chamber 22 of a drying vessel 24. The moist exit air flows radially through an adsorption medium 26 contained in the drying vessel 24. The adsorption medium 26 may comprise, for example, silica gel and/or a molecular sieve, which extracts the moisture from the air. The dried air which flows from the adsorption medium 26 into a central duct 28 of the drying vessel 24, passes to an outlet line 30 which leads out of the drying vessel 24 and in which a heating device 7 is installed.

The drying air feed line 5 branches off from the outlet line 30 outside the drying vessel 24, and a flap valve 29 is disposed in the drying air feed line 5. Another line 32 also branches off from the section of outlet line 30 which extends out of the drying vessel 24. This branch line 32 also comprises a flap valve 31, and leads to a heat accumulator 50. Heat accumulator 50 takes the form of a box which is closed with the exception of the feed and discharge lines and in which a heat storage medium 55 is housed between oppositely disposed screens 52 and 54. Heat storage medium 55 may consist of glass balls, rocks or iron balls or even of a mixture of screws, nuts and similar metallic hardware or metal shavings. A gas line 34 leads into the heat accumulator 50 at the end opposite branch line 32. Line 34 branches into a line 33 which leads to an intake filter 36 and a gas line 38 on which a reversing valve 40 is disposed. When the valve body of valve 40 is in the position illustrated by broken line 42, the valve connects the line 38 with a line 35 leading into line 16 through a flap valve 37, which thereby connects line 38 with fan 18. When the valve body of valve 40 is in the position illustrated by solid line 44, the reversing valve connects line 35 with a short chimney section 39 leading to the open air.

During the adsorption phase, flap valve 14 opens and flap valve 37 closes, while fan 18 draws exit air from drying hopper 1 through line 8 and filter 12 and forces the exit air through line 20 into the annular outer chamber 22 of the drying vessel 24. The exit air passes radially through the adsorption medium 26 in the drying vessel 24. In the illustrated preferred embodiment, the adsorption medium 26 comprises a layer of silica gel and a layer of molecular sieve. The air dried by the adsorption medium 26 passes radially into the central duct 28 and from thence into the outlet line 30, where the air is heated by the switched-on heating device 7. The heated air is then guided through open flap valve 29 and line 5 back into the drying hopper 1 as drying air, while the flap of flap valve 31 remains closed.

When the adsorption medium 26 becomes saturated with moisture, which can be sensed if desired by sensors in the adsorption medium and transmitted to a control device (not shown), the control device reverses the direction of rotation of the fan 18 so that then, because of the changed pressure conditions in lines 5, 8, 16, 32, the flap valves 31 and 37 will open up while the flap valves 14 and 29 will close. The reversing valve 40 is in position 44. Fan 18 draws in outside air through filter 36 which passes via lines 34 and 32 through accumulator 50, thereby bringing the accumulator 50 to the temperature of the outside air. The outside air then arrives in line 30 where it is heated by the switched-on heating device 7 to a temperature of, for example, 250° C. The heated air then flows radially outwardly from central duct 28 through the adsorption medium 26 into the annular outer chamber 22, and in the process picks up the moisture from the adsorption medium 26, after which the air leaves the drying vessel 24 through line 20 and is exhausted by fan 18 though lines 35 and 39.

When all moisture has been driven out of the adsorption medium 26, which has a temperature of, for example, about 250° C., the regeneration phase is concluded so that the cooling phase can begin. If desired, the moisture level in the adsorption medium can be determined by a suitable sensor (not shown). Entry into the cooling phase is accomplished by switching the valve 40 from position 44 to position 42 and switching off the heating device 7. The hot outside air which then leaves the drying vessel 24 is forced by the fan 18 through line 35 into line 38 and from line 38 through line 34 into the heat accumulator 50, where the heat storage material 55 absorbs the heat carried by the hot gas. The gas is recirculated by fan 18 through lines 32, 30, 20, 35, 38 and 34 several times so that gradually (e.g. over a period of several minutes) the quantity of heat which was contained in the adsorption medium 26 is transferred to the heat accumulator 50. The pressure conditions existing in lines 38 and 34 prevent new outside air from being taken in. Thus, during the cooling, the adsorption medium 26 is not exposed to any additional moisture beyond that originally present in the circulating outside air because no new outside air is taken in for the cooling. This so-called residual moisture is extremely low. If necessary, another reversible valve may be installed in branch line 33 which extends from the junction of lines 38 and 34 to filter 36.

After completion of the cooling phase, the direction of rotation of fan 18 and the position of reversible valve 40 are again reversed by the control device so that a new adsorption phase can begin.

At the start of the subsequent regeneration phase, the heat contained in the heat accumulator is used to heat the outside air taken in through filter 36 so that the quantity of heat stored in the accumulator may be used for heating the hot gas required for the regeneration so that the heating device 7 may be switched on at a later point in time, thereby saving energy.

Figure 2:
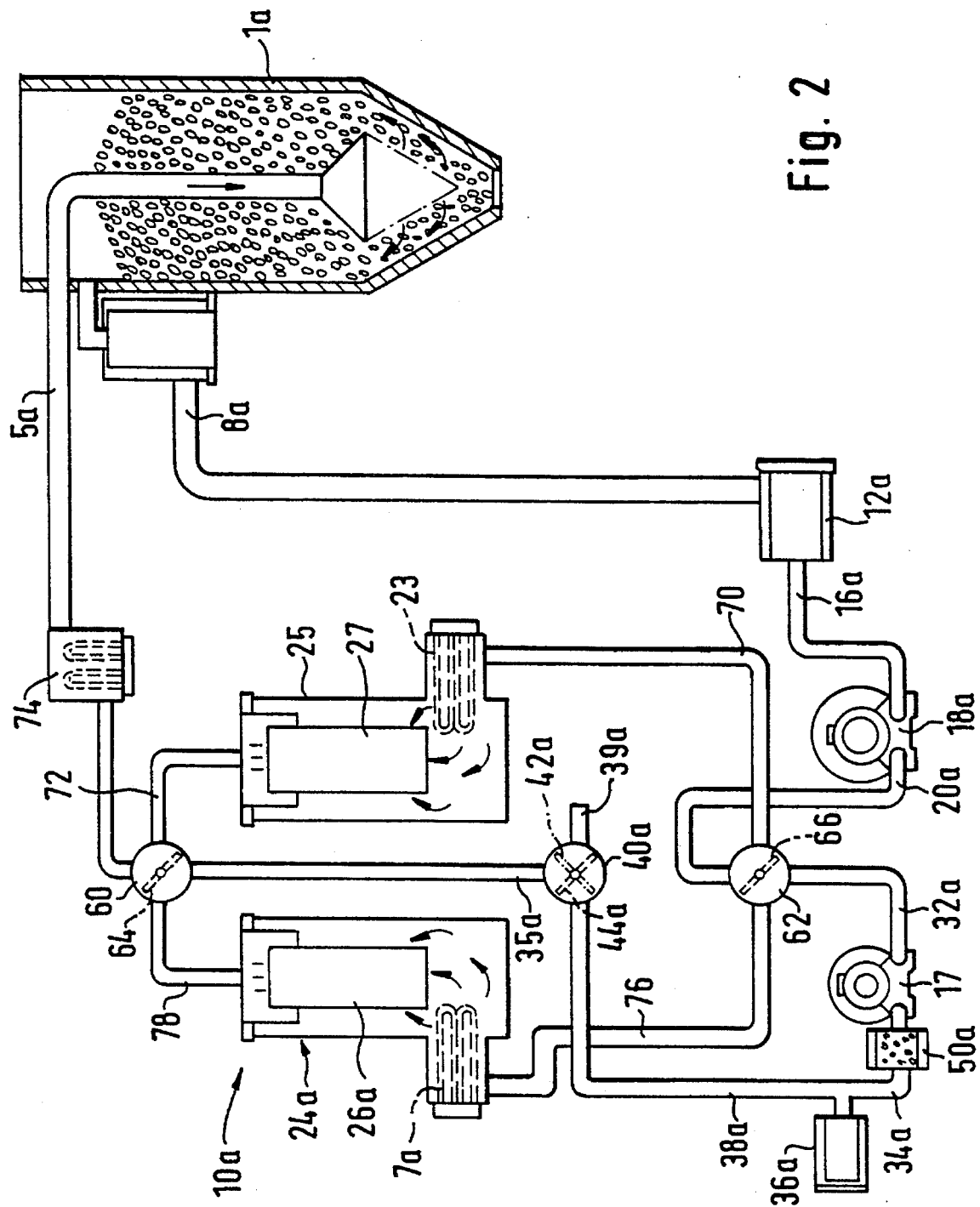
FIG. 2 is an apparatus equipped with the features of the invention comprising two parallel drying vessels.

FIG. 2 illustrates an apparatus comprising two drying vessels 24a and 25 which are connected in parallel and which are operated alternately in the adsorption and regeneration cycles. The structural components in the apparatus of FIG. 2 which correspond in function to the structural components of the apparatus of FIG. 1, are identified by the same reference numbers with the suffix "a".

The exit air from the granule drying hopper 1a passes through line 8a, filter 12a and connecting line 16a to a fan 18a, whose pressure line 20a leads to a first reversing valve 62. In the illustrated position of the valve body 66, the exit air passes through line 70 and past a heating device 23 to drying vessel 25 which still contains sufficiently dry adsorption medium 27. The heating device 23 is therefore switched off, and the gas flowing into the drying vessel 25 passes through the adsorption medium 27 contained therein, which extracts moisture from the exit gas. The dry gas leaves the drying vessel 25 through discharge line 72 which leads to another reversing valve 60. In the illustrated position of the valve body 64, the drying air from line 72 passes through supply line 5a, and through heating device 74 which is mounted thereon, into the drying hopper 1a.

Simultaneously, a fan 17 draws in outside air through intake filter 36a, line 34a and heat accumulator 50a which is mounted on line 34a and which is brought to the temperature of the outside air as the air passes therethrough. Fan 17 forces the air through pressure line 32a, reversing valve 62, line 76 connected behind it and a switched-on heating device 7a, into the second drying vessel 24a, where the outside air, which has been heated to approximately 250° C., flows through the adsorption medium 26a and picks up the moisture contained in the adsorption medium. The moisture-laden hot air then passes through discharge line 78 of drying vessel 24a and through an additional reversing valve 60 in line 35a from where the moisture-laden air, as a result of position 44a of the valve body of the reversing valve 40a, is exhausted through line 39a.

When the regeneration is concluded, the cooling phase is entered during which the valve body of reversing valve 40a is changed to the position shown by broken line 42a so that the hot, now dry air stream from line 35a passes through reversing valve 40a to line 38a which leads into line 34a between the intake filter 36a and the heat accumulator 50a, so that the hot gas can deposit the heat carried therein in the heat accumulator 50a. The gas is circulated by the running fan 17 through lines 32a, 76, 78, 35a, 38a and 34a until the adsorption medium 26a is sufficiently cooled. Then reversing valves 60, 62 and 40a are reversed so that drying vessel 25 can enter the regeneration cycle and drying vessel 24a can enter the adsorption cycle. As the regeneration of drying vessel 25 commences, the outside air drawn in through outside filter 36a by fan 17 is heated in the now hot heat accumulator 50a so that, as in the embodiment of FIG. 1, the heat contained in the adsorption medium 26a at the start of the cooling can be used to heat outside air to produce hot gas for regenerating the adsorption medium 27 at the start of the regeneration phase.

Figure 3:
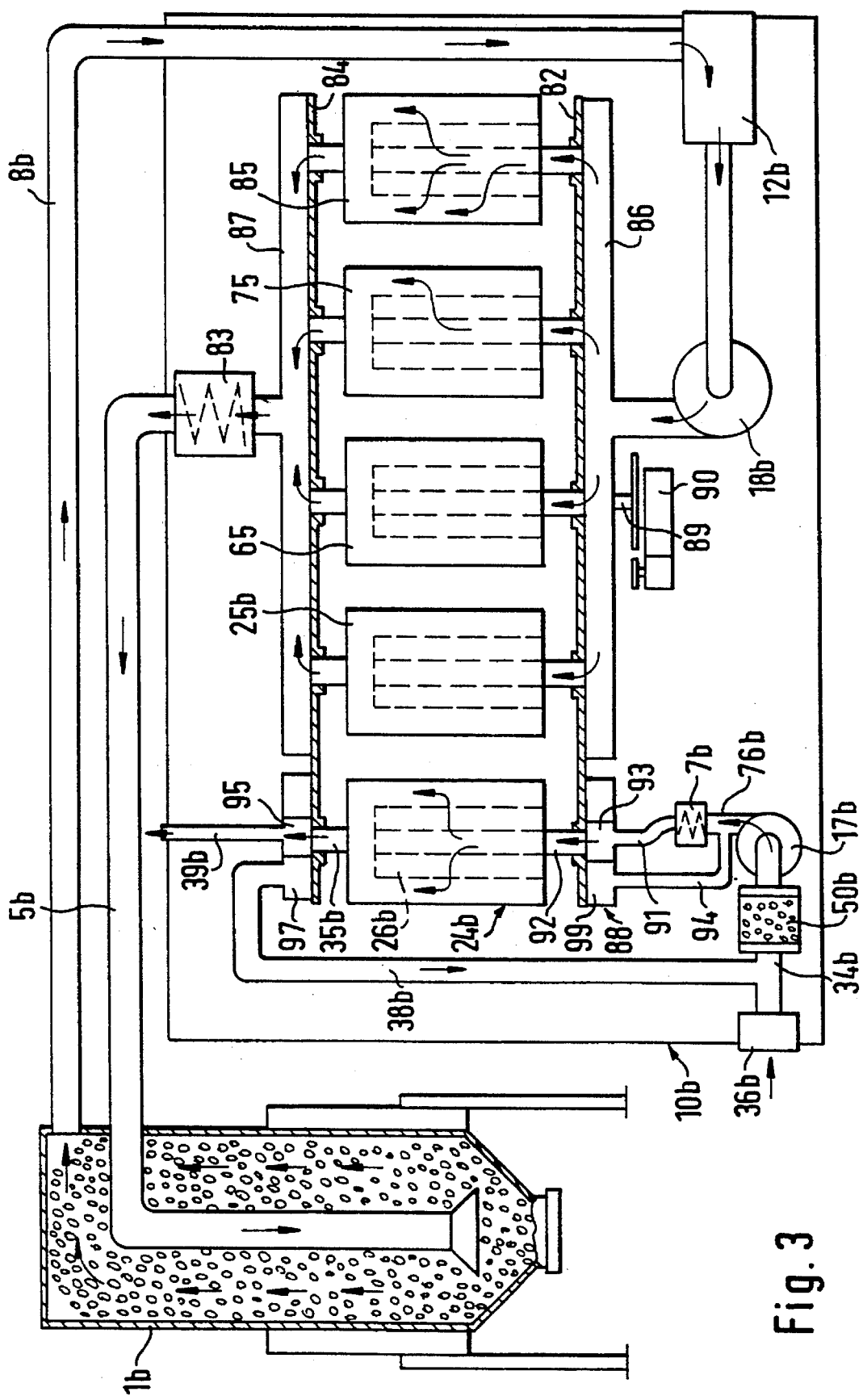
FIG. 3 is an apparatus equipped with the features of the invention comprising a plurality of drying vessels arranged on a carousel;.

The drying air dryer shown in FIG. 3 associated with the drying hopper 1b is of the "carousel" design disclosed in U.S. Pat. No. 3,757,492. In this illustrative embodiment, the carousel contains five drying vessels 25b, 65, 75, 85 and 24b which are mounted in opposing openings of a lower valve disk 82 and an upper valve disk 84 and which can be rotated together with the upper and lower valve disks by means of a shaft 89 driven by a motor 90. Three lower stationary valve chambers 86, 93, 99 are associated with the lower valve disk 82, while the upper valve disk 84 cooperates with three stationary upper valve chambers 87, 95, 97. The five drying vessels are arranged on a circular path which is concentric to the shaft 89, and the six valve housings are constructed along concentric arcs of a circle. A fan 18b draws in moisture-laden exit gas from an exit gas line 8b through a filter 12 and conveys it as shown by the arrows through lower valve housing 86 to the openings corresponding to the drying vessels 25b, 65, 75, 85 and into the drying vessels, which are in the adsorption phase. Moisture is extracted from the wet exit gas by the adsorption medium contained in drying vessels 25b, 65, 75 and 85, so that drying air leaves the drying vessels 25b, 65, 75, 85 through the openings corresponding with the upper valve housing 87, is heated to the required temperature by heating device 83, and is supplied to drying hopper 1b through a drying air line 5b as shown by the arrows.

The fifth drying vessel 24b is in the regeneration phase during which outside air is drawn in by fan 17b through intake filter 36b, line 34b and heat accumulator 50b and is supplied via a duct 76b and a heating device 7b, to a connecting line 91 of valve chamber 93. From valve chamber 93, the hot air passes as shown by the arrow through an opening into the interior of drying vessel 24b and then flows through the moisture-saturated adsorption medium 26b, where the hot gas picks up moisture. The gas then leaves drying vessel 24b through line connecting line 35b and valve chamber 95, from where it is discharged through chimney 39b.

During the cooling phase, which follows the regeneration phase, the carousel comprising the five drying vessels and the associated valve disks 82 and 84 is rotated further around the axis 89 so that the connecting line 35b is situated above the valve chamber 97 and an inlet line 92 is situated above the valve chamber 99. Valve chamber 97 is connected by line 38 to connecting line 34b. Fan 17b then forces the hot gas which flows out of the drying vessel 24b into valve chamber 97 and through lines 38b and 34b into heat accumulator 50b, which absorbs the heat from the hot gas. Since the intake line 92 is no longer situated above valve chamber 93 but above valve chamber 99, the air delivered by the fan 17b can only pass through branch duct 94 into valve chamber 99 and from there through an opening (not shown) in the intake line 92 and thence into drying vessel 24b. In its further course, the air which passes through the adsorption medium 26b in order to cool it, is forced through outlet line 35b and an opening (not shown) into the valve housing 97 and then is conveyed through ducts 38b and 34b back to the heat accumulator 50b.

When the adsorption medium 26b has been sufficiently cooled, the drying vessel 24b is transferred back to the adsorption phase by an appropriate rotation of the carousel, while one of the other drying vessels 25, 65, 75 or 85 is transferred by the turning of the carousel into the regeneration phase in the position previously occupied by drying vessel 24b in FIG. 3. Through intake filter 36b, fan 17b will then draw in cool outside air which is heated in the heat accumulator 50b, and after the heat content of the accumulator is exhausted, is further heated by the heating device 7b to the required temperature of 250–300° C.

EXAMPLE

Drying air dryer for 200 m³/hour of drying air.

In the carousel dryer described above, one of the drying vessels may remain in the adsorption phase approximately 60 minutes. The subsequent regeneration phase may last approximately 10 minutes, and the subsequent cooling phase may last approximately 5 minutes. Each drying vessel may contain a filling of from 2 to 4 kg of a molecular sieve. The throughput of regeneration air may amount to 50–100 m³/hour. The regeneration air temperature (hot gas temperature) may be between 180° C. and 250° C. The heat accumulator may contain from 4 to 8 kg of steel balls having an average diameter of 2 to 10 mm. The flap valves mentioned in the specification are preferably check valves. The drying air dryer may be designed for a drying air quantity of 20 to 2,000 m³/h.

Figure 4:
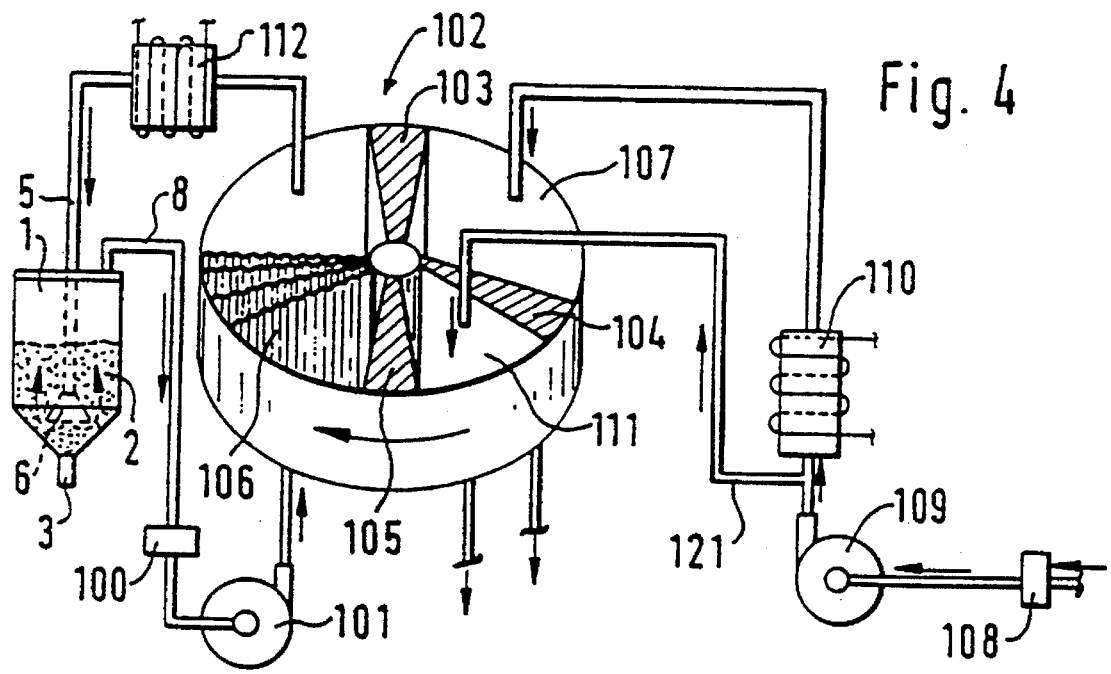
FIG. 4 is an illustration of an apparatus for drying moist plastic granules comprising a honeycomb dryer.

FIG. 4 illustrates a honeycomb dryer used for removing moisture from air. A charge of plastic granules 2 is continuously or intermittently introduced into a drying hopper 1, where it is dried. After drying, the granules are discharged from drying hopper 1 through lower discharge opening 3. In order to dry the granules 2, a drying air supply line 5 extends into the drying hopper 1 and ends in a distributor 6 adjacent discharge opening 3. Drying air, which has been heated to the required temperature of 80° C. or more, is introduced through line 5 into the drying hopper 1, flows upwardly through the charge 2 in the hopper, and leaves the hopper through an exit air line 8 emanating from the lid of the drying hopper 1. The moisture-laden exit air from the drying hopper 1 is conducted through exit air line 8, a filter 100 and a delivery pump 101 to a drying air dryer 102. This dryer is designed as a so-called honeycomb dryer, i.e. it comprises a rotary disk which rotates approximately 1 to 3 times per hour. By means of three stationarily arranged sealing strips 103, 104, 105, the honeycombs—typically folded paper or fiber glass which is coated with a molecular sieve—are divided into three areas. In area 106, the moisture in the return air coming from the drying hopper 1 is a absorbed. In section 107, moisture adsorbing agent is regenerated by blowing heated outside air therethrough. The outside air reaches this section 107 through a filter 108 and a fan 109 as well as a heating device 110. In section 111, cool outside air is blown in for cooling purposes through line 112. Then the thus treated honeycombs rotate into the adsorption part. The honeycomb disk rotates continuously. The three operations—absorption, heating and cooling, take place adjacent each other in a continuous manner. A honeycomb dryer can, for example, also be found in the publication "Multi Function System, Multi Jet II" of Matsui Corp.

Figure 5:
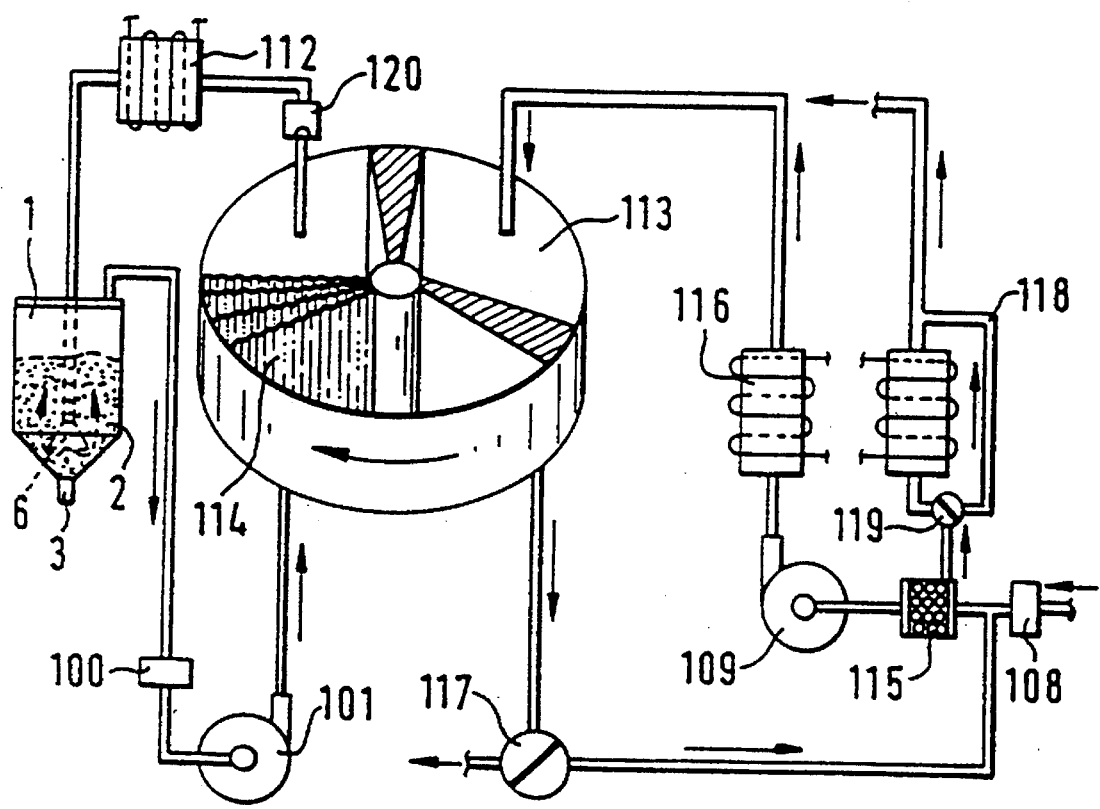
FIG. 5 is a are view of an apparatus equipped with the features of the invention comprising a heat accumulator.

FIG. 5 shows the use of a heat accumulator with such a honeycomb dryer. The cooling zone 111 shown in FIG. 4 has been omitted. Instead, the heating for the purpose of regeneration and the subsequent cooling occur in the same section, specifically in section 113. During a heating and cooling cycle, the honeycomb body is stopped. After the conclusion of the heating and the cooling, the honeycomb body is rotated further by an amount which moves the regenerated and cooled honeycomb part into the adsorption zone 114 and, at the same time, moves a moisture-saturated honeycomb part into the regeneration zone 113.

As also illustrated in FIG. 4, the adsorption zone receives the moisture-laden exit air from the drying hopper 1. After a honeycomb part enters the regeneration zone 113, during a time period of typically 2 to 6 minutes, outside air is drawn in through filter 108, conducted through heat accumulator 115, and heated by the regeneration heating device 116 to the required regeneration temperature. This heated air is conducted through the regeneration zone where it adsorbs the moisture contained there and then the resulting moisture-laden air is exhausted through valve 117. When, the moisture is driven out of the adsorption medium, which has a temperature of approximately 250° C., the regeneration phase is concluded so that the cooling phase may begin.

The cooling phase is initiated by reversing the valve 117. The hot outside air which then leaves the regeneration zone is forced by the fan 109 into the heat accumulator 115. The heat storage material of the accumulator absorbs the heat carried by the hot gas. The gas is then repeatedly circulated by the fan so that gradually, e.g. over the course of several minutes, the heat contained in the adsorption medium is transferred to heat accumulator 115. In this case, no outside air is taken in. Thus, the adsorption medium in the honeycomb dryer is not exposed to any additional moisture beyond that which was originally present in the circulating outside air because no new outside air is taken in for the cooling. As described above, at the conclusion of the cooling phase, the honeycomb body is rotated further by an amount and a new regeneration cycle is started.

FIG. 5 illustrates a modification of the regeneration circulating system. In this modification, a bypass valve 119 is provided and a bypass line 118 is arranged in parallel with the heating device 116. This bypass line 118 is connected during cooling of the regeneration zone so that the heat content of the heating device 116 will not be lost, i.e so that the heating device will not be cooled down. In this way, further savings with respect to the thermal energy required for the process can be achieved.

In order to activate the bypass according to FIG. 5b, a switching valve 119 is provided. The regeneration air is thereby conducted through the heater during the heating stage, and diverted along a parallel path around the heater during the cooling stage.

The overall arrangement with brief stops by the honeycomb dryer has the advantage that a new portion of the honeycomb does not need to be regenerated before it is sufficiently saturated with water. A sensor 120, which is arranged in the supply line (i.e. the drying air line), is provided for measuring, for example, the dew point of the just dried air. By means of this measurement, the moisture adsorption capacity of the adsorption agent can be optimally utilized. In addition, the length of the adsorption stage is thereby controlled with reference to the amount of moisture which is adsorbed. Of course, it is also possible to determine the amount of adsorbed moisture by gravimetrically measuring the honeycomb body or by means of a thermosensor which monitors the temperature of the adsorption medium.

If the moisture content of the dried air falls outside a predetermined limiting value, then the honeycomb body is rotated an amount corresponding to the size of one segment. This means that the honeycomb body is only rotated when it is actually necessary to regenerate the adsorption medium.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for regenerating an adsorption medium which is freed of an agent adsorbed therein by treatment with a hot gas and thereafter cooled by a stream of cooling gas, wherein a warmed stream of cooling gas emerging from the hot adsorption medium is conducted through a heat accumulator for taking up heat from the hot adsorption medium and then recirculated through the adsorption medium.

2. A process according to claim 1, wherein said adsorbed agent is water vapor.

3. A process according to claim 1, wherein a moisture-laden exhaust gas is conducted through a moisture adsorption medium until the moisture adsorption medium is saturated with water; then the saturated adsorption medium is regenerated by treatment with a hot gas, and subsequently the regenerated adsorption medium is cooled by a stream of cooling gas.

4. A process according to claim 1, wherein a gas which has been conducted through the hot heat accumulator is used as the hot gas for regenerating the adsorption medium.

5. A process according to claim 4, wherein ambient air is conducted through the hot heat accumulator and then used as the hot gas for regenerating the adsorption medium.

6. A process according to claim 1, wherein said stream of cooling gas emerging from the hot adsorption medium is repeatedly recirculated through the heat accumulator and the adsorption medium until the adsorption medium is cooled to a desired temperature.

7. A process according to claim 1, wherein said heat accumulator comprises at least one heat storage medium selected from the group consisting of glass, metal pieces and rocks.

8. A process according to claim 7, wherein said heat storage medium comprises balls of material having average diameters less than 10 mm.

9. A process according to claim 8, wherein said balls of material have an average diameter of from 2 to 10 mm.

10. A process according to claim 1, wherein said accumulator contains an amount of heat storage medium such that the product of the weight of the heat storage medium times the specific heat of the heat storage medium is at least equal to the product of the weight of the adsorption medium to be dried times the specific heat of the adsorption medium.

11. An apparatus for regenerating an adsorption medium in which the adsorption medium is freed of an adsorbed substance by treatment with a hot treatment gas, said apparatus comprising:

at least one dryer vessel containing a charge of an adsorption medium for said substance;

a supply line for a gas containing said substance;

a connecting line leading from said supply line to said at least one vessel;

an outlet line for exhausting gas from said at least one vessel;

a regeneration line communicating between said connecting line and said outlet line;

a heater associated with said at least one vessel for heating a gas flowing therethrough;

a heat accumulator associated with said regeneration line for absorbing heat from a hotter gas or releasing heat to a cooler gas traversing said regeneration line;

valve means for selectively switching gas flow in said apparatus between a drying circuit comprising said supply line, said connecting line, said at least one vessel containing said charge of adsorption medium, and said outlet line; and a regenerating circuit comprising said regeneration line, said heat accumulator, said heater, said at least one vessel containing said charge of adsorption medium, and said connecting line; and fan means operable to convey gas through said drying circuit or through said regenerating circuit.

12. An apparatus according to claim 11, wherein said fan means comprises a reversible fan on said connecting line.

13. An apparatus according to claim 11, wherein said fan means comprises a first fan on said supply line and a second fan on said regeneration line.

14. An apparatus according to claim 13, wherein said heat accumulator is arranged on said regeneration line upstream of said second fan.

15. An apparatus according to claim 11, further comprising a gas inlet and a gas outlet on said regeneration line, and wherein said valve means is operable to selectively direct gas from said regeneration line to said outlet, whereby replacement gas will be drawn through said inlet into said regeneration line.

16. An apparatus according to claim 11, further comprising a bypass line connected to said regeneration line, whereby gas can flow between said heat accumulator and said at least one vessel without passing through said heater.

17. An apparatus according to claim 11, wherein said heat accumulator comprises at least one heat storage medium selected from the group consisting of glass, metal pieces and rocks.

18. An apparatus according to claim 17, wherein said heat storage medium comprises balls of material having average diameters of from 2 to 10 mm.

19. An apparatus for regenerating an adsorption medium, said apparatus comprising:
   a dryer comprising a plurality of movable sections each containing a charge of said adsorption medium;
   a supply line for a gas containing a substance to be adsorbed;
   a connecting line leading from said supply line to a first section of said dryer;
   an outlet line for exhausting gas from said first section of said dryer;
   a regeneration line communicating with a second section of said dryer;
   a heater associated with said regeneration line for heating a gas flowing therethrough;
   a heat accumulator associated with said regeneration line for absorbing heat from a hotter gas or releasing heat to a cooler gas traversing said regeneration line;
   means for moving said dryer sections to switch sections containing said adsorption medium between
      a drying circuit comprising said supply line, said connecting line, said first section of said dryer containing a charge of adsorption medium, and said outlet line; and
      a regenerating circuit comprising said regeneration line, said heat accumulator, said heater, and said second section of said dryer containing a charge of adsorption medium; and
   fan means operable to convey gas through said drying circuit and through said regenerating circuit.

20. An apparatus according to claim 19, wherein each charge of adsorbing medium comprises a water-adsorbing molecular sieve.

21. An apparatus according to claim 19, wherein said dryer comprises a plurality of drying vessels mounted on a carousel each containing a charge of said adsorption medium, and said means for moving comprise means for turning said carousel.

22. An apparatus according to claim 19, wherein said dryer comprises a honeycomb vessel rotatable about a symmetrical axis; said sections containing a charge of adsorption medium comprise sectors of said honeycomb vessel; and said means for moving comprise means for rotating said honeycomb vessel about said axis to, switch sectors between said drying circuit and said regenerating circuit.

23. An apparatus according to claim 22, wherein said honeycomb vessel comprises a drying sector, a regeneration sector, and a cooling sector.

24. An apparatus according to claim 22, wherein said honeycomb vessel comprises a plurality of individual sectors separated by stationarily arranged sealing strips.

25. A process for regenerating an adsorption medium comprising treating said adsorption medium with a hot gas to remove an adsorbed agent and subsequently contacting the adsorption agent with a cooler gas stream to cool said adsorption agent, wherein a gas stream exiting from the hot adsorption medium is conducted through a heat accumulator in order to take up heat extracted from the warm adsorption medium and after passing through the heat accumulator is recycled through said adsorption medium, and wherein the adsorption medium is contained in a honeycomb dryer which comprises a rotationally symmetrical container divided into a plurality of adsorption medium-containing segments, and said container is periodically rotated to shift adsorption medium-containing segments thereof between a drying station, a regenerating station and a cooling station.

26. A process according to claim 25, further comprising monitoring the dew point of a dried air stream exiting from an adsorption medium-containing segment in said drying station, and rotating said container to shift the adsorption medium-containing segment to said regeneration station and initiate regeneration of the adsorption medium when the dew point of the dried air exceeds a desired value.

27. A process according to claim 25, wherein the regeneration comprises a heating phase and a cooling phase, and wherein during said heating phase, hot air for regenerating said adsorption medium is conducted through a heater, and during said cooling phase, air is conducted around said heater through a parallel bypass line.

* * * * *